US006725134B2

(12) United States Patent

Dillen et al.

(10) Patent No.: US 6,725,134 B2

(45) Date of Patent: Apr. 20, 2004

(54) CONTROL STRATEGY FOR DIESEL ENGINE AUXILIARY LOADS TO REDUCE EMISSIONS DURING ENGINE POWER LEVEL CHANGES

(75) Inventors: Eric Richard Dillen, Erie, PA (US); Shawn Michael Gallagher, Erie, PA (US); Norman Zethward Shilling, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/108,684

(22) Filed: Mar. 28, 2002

(65) Prior Publication Data

US 2003/0187553 A1 Oct. 2, 2003

(51) Int. Cl.[7] .................................................. H02P 9/04

(52) U.S. Cl. ............................. 701/19; 701/20; 701/36; 701/101; 123/339.18

(58) Field of Search .............................. 701/19, 20, 36, 701/48, 101, 102, 103; 123/339.18

(56) References Cited

U.S. PATENT DOCUMENTS

| | | | | |
|---|---|---|---|---|
| 4,634,887 A | * | 1/1987 | Balch et al. | 290/3 |
| 5,038,728 A | * | 8/1991 | Yoshida et al. | 123/198 R |
| 5,080,059 A | * | 1/1992 | Yoshida et al. | 123/198 R |
| 5,646,510 A | * | 7/1997 | Kumar | 322/16 |
| 6,087,791 A | * | 7/2000 | Maruyama | 318/140 |
| 6,283,100 B1 | * | 9/2001 | Chen et al. | 123/563 |
| 6,380,639 B1 | * | 4/2002 | Soucy | 290/40 B |
| 6,476,510 B2 | * | 11/2002 | Soucy | 290/40 C |

* cited by examiner

*Primary Examiner*—William A. Cuchlinski, Jr.
*Assistant Examiner*—Eric M Gibson
(74) *Attorney, Agent, or Firm*—Carl A. Rowold; John L. DeAngelis, Jr.; Beusse Brownlee Wolter Mora & Maire, P.A.

(57) ABSTRACT

A diesel locomotive includes a number of auxiliary subsystems operating in conjunction with the locomotive diesel engine and deriving their energy, from the diesel engine. Included among the subsystems are various cooling systems, the battery charging system, and the electrical generation system, comprising one or more alternators drivingly coupled to the engine shaft. Each of the subsystems includes a component that is activated when one or more operational conditions associated with the subsystem are met. For instance, an engine cooling system fan motor is activated when the coolant temperature exceeds a predetermined value. Similarly, a battery charger is activated when the battery voltage falls below a predetermined value, and an alternator blower is activated when the main or auxiliary alternator temperature exceeds a predetermined value. The activation of these power consuming auxiliary devices while the diesel engine is transitioning from a first load state to a higher load state, causes the formation of excessive smoke emissions. According to the present invention, the activation of these auxiliary components is delayed until the diesel engine has reached steady-state operation, after which the elements are activated as required. Also, in the event a subsystem operational parameter exceeds a predetermined critical limit, the auxiliary device is immediately activated, even if the diesel engine is in a transition state to a higher load value.

22 Claims, 3 Drawing Sheets

CONTROL STRATEGY FOR DIESEL ENGINE AUXILIARY LOADS TO REDUCE EMISSIONS DURING ENGINE POWER LEVEL CHANGES

BACKGROUND OF THE INVENTION

The invention relates generally to an apparatus and method for controlling auxiliary loads of a diesel engine, and more specifically to an apparatus and method for controlling the activation of auxiliary loads during the time immediately following a command to the diesel engine to provide additional output horsepower and prior to the time when the diesel engine has reached steady-state operation in response to that command.

Large self-propelled vehicles, such as locomotives, off-highway vehicles and transit cars commonly use a diesel engine to drive an electrical generating system, which in turn supplies electrical current to a plurality of direct-current (DC) or alternating current (AC) traction motors having rotors drivingly coupled, through speed-reducing gearing, to axle-wheel sets of the vehicle. The generating device typically comprises a main three-phase traction alternator, having a rotor mechanically coupled to the output shaft of the engine, which is conventionally a 16-cylinder turbo-charged diesel engine. When current excitation is applied to the field windings of the rotating rotor, alternating voltages are generated in the three-phase stator windings. These voltages are rectified and applied to the armature windings of the traction motors via a DC link. Typically, there is also an auxiliary alternator, which is also mechanically coupled to the output shaft of the engine, for producing alternating current to drive a plurality of auxiliary vehicle systems, such as a cooling radiator fan and a cooling traction motor fan.

During the motoring or propulsion operational mode, a locomotive diesel engine tends to deliver constant power from the traction alternator to the traction motors, as determined by the throttle setting and ambient conditions, but regardless of the locomotive speed. For maximally efficient performance, the electrical power output of the traction alternator must be suitably regulated so that the full engine power is efficiently utilized. For proper train handling, intermediate power output levels are provided to permit graduated power application to the traction motors, by controlling the excitation current supplied to the main alternator, through the operation of the operator-controlled handle or throttle, discussed further below. The traction alternator load on the engine must not exceed the power the engine is capable of developing. Engine overloads can cause premature wear, engine stalling or other undesirable effects. Historically, the locomotive control system has included the operator controlled handle, allowing the operator to select the traction power level, in discrete steps between zero and maximum, so that the traction and auxiliary alternators can supply the power demanded by the traction load and the auxiliary loads, respectively.

The engine horsepower is proportional to the product of the angular velocity of the crank shaft and the torque opposing crank shaft motion. To vary and regulate the engine power output, it is common practice to equip a locomotive engine with a speed regulating governor for adjusting the quantity of pressurized diesel fuel injected into each of the engine cylinders so that the actual crank shaft speed (in RPM) corresponds to the desired engine speed. The desired speed is set within permissible limits, by the lever or throttle handle that can be selectively moved through eight steps or notches between a low engine speed position (notch one) and a maximum engine speed (notch eight). The throttle handle is one element of the operator's control console located in the cab of the locomotive. In addition to the eight conventional power notches, the handle further includes an idle position and a continuously variable dynamic braking position, allowing application of the dynamic brakes from zero percent to 100 percent of full allowable dynamic braking. The notch call or throttle handle position defines the engine speed and the engine load, as requested by the locomotive operator. A change from one notch position to the next consecutive notch position changes the delivered horsepower; certain notch position changes also command a change in the engine speed. In response to the throttle position the main locomotive controller commands the traction alternator to supply the demanded load, typically measured in the product of the traction alternator output current and the output voltage. The locomotive controller also responds to the engine speed demand at the notch position by controlling the fuel mass injected into each engine cylinder.

For each of its eight different notch settings, the engine is capable of developing a corresponding constant horsepower, assuming maximum output torque. The throttle notch eight position commands a maximum engine speed (e.g. 1,050 RPM) and a maximum rated gross horse power (e.g. 4,500). The engine output power at each notch position is equal to the power demanded by the traction motors, as supplied by the engine-driven traction alternator, plus the power demanded by the electrically driven auxiliary equipment or loads. Each notch position commands a different engine load or horsepower, but a few of the notch positions command the same engine speed with different horsepower values.

The output power (measured in kVA) of the main or traction alternator is proportional to the product of the RMS magnitude of the generated voltage and load current. The voltage magnitude varies with the engine speed and is also a function of the excitation current supplied to the alternator field windings. To accurately control and regulate the power supplied to the electrical loads (i.e., the main traction motors and the auxiliary loads), it is common practice to adjust the field or excitation current supplied to the main alternator to compensate for load changes, i.e., changes in the traction motor loading and/or auxiliary equipment loading. This minimizes the error between the actual output power and the desired output power and reduces the engine load. The desired output power is established by the locomotive operator by placement of the throttle handle in one of the notch positions one through eight. The resulting control over the excitation current creates a balanced steady-state condition resulting in substantially constant and optimum electrical power output for each position of the throttle handle.

It is also desirable to control the engine fuel flow to maintain a constant engine RPM for the notch position horsepower. Sudden changes in demanded horsepower (either by way of the traction or the auxiliary alternator) can cause the engine to be temporarily over-fueled or under-fueled due to the compensation made by the controller to maintain engine speed. If the engine is over fueled, the resulting low air-to-fuel ratio causes incomplete combustion, resulting in excessive exhaust emissions from unburned hydrocarbons. If insufficient fuel is supplied, the engine may bog and stall.

Recent amendments to the United States environmental protection statutes and regulations mandate specific visible smoke/particulate and invisible emissions levels from locomotive diesel engines. One such requirement is the reduction of oxides of nitrogen ($NO_x$) emissions, which can be lowered by retarding the injection fuel timing of the diesel engine. But this timing modification increases fuel consumption and operating costs and therefore it is desirable to increase the engine compression ratio to gain back some of the fuel consumption losses. However, increasing the compression ratio increases the visible smoke emissions when the engine is not fully loaded. The problem of visible smoke is especially acute during low load conditions and transient load and speed changes, i.e., when the locomotive operator advances the throttle to a higher notch position to call for higher speed and/or greater load pulling capacity (i.e., horsepower). $NO_x$ emissions are especially prevalent at high engine loads.

Given the substantial focus on the reduction of smoke and $NO_x$ emissions, many different techniques for lowering these emissions have been proposed. One class of solutions involves the after-treatment of the exhaust stream by use of selective catalytic reductions (e.g. injecting urea into the exhaust system to reduce $NO_x$ emissions) and catalytic converters. A second solution involves in-cylinder treatment to reduce the formation of a particular pollutant within the combustion chamber. In-cylinder control can be achieved through the manipulation of a fuel injection parameter (such as injection pressure, spray angle, timing, etc.), exhaust gas recirculation, water emulsification or the direct injection of water into the combustion chamber. Attention has also been focused on new injection systems including common rail unit pumps, split injection and injection rate shaping.

The auxiliary alternator discussed above supplies power to the auxiliary loads that include the motors powering the radiator fan, the traction motor blowers and the alternator blower. The auxiliary alternator also powers the brake system air compressor, the battery charging system and the main (or traction) alternator excitation system. Typically, the radiator fan, the traction motor blower and the air compressor are powered by three-phase multi-speed AC motors that run synchronously with the engine revolutions. The availability of multiple speeds for these motors is achieved through the use of cycle skippers that control the frequency of the alternating current (AC) delivered to the blower motors. To increase the speed of an auxiliary motor, for example, from ¼ speed to ½ speed (i.e., where the fraction is with respect to maximum engine speed), the cycle skipping process requires that the motor first be brought to full speed, the input power removed, allowing the motor to coast down to the desired speed. When the motor has reached the desired operating speed, power is reapplied, but at the proper AC input signal frequency to maintain the desired speed. For example, for operation at ½ speed, the AC frequency signal is divided by two. Typically, only the radiator cooling fan and the traction motor blower operate at less than synchronous speed. In particular, the cooling fan is operative at ¼, ½ and full speed and the traction motor blower is operative at ½ or full speed.

At lower notch positions, i.e., when the engine is delivering less energy, the horsepower required to start or increase the speed of an auxiliary load, for instance, the radiator fan, can be about the same order of magnitude as the steady-state traction motor load, thus creating a large load on the diesel engine. Analysis of the auxiliary load situation further must consider the possibility that additional auxiliary loads (e.g., blowers or fans) may be added to future locomotives to further reduce steady-state and transient emissions limits.

It is also known that when the locomotive is operating in the mid and lower notch positions, there is insufficient energy in the exhaust system to power the engine turbocharger and as result, the engine behaves as a naturally aspirated engine. Under these conditions, the engine operates with lower air-to-fuel ratios and is more sensitive to transient load changes, that is, either an increase in speed and/or load. If the speed and/or load is increased too rapidly, smoke and particulates are formed and the engine performance is degraded.

The increasingly stringent environmental regulations mentioned above suggest the development of a better strategy to control transient loading of the diesel engine to ensure compliance with applicable emission regulations. Current Environmental Protection Administration regulations permit short term visible emission spikes (of 5 seconds or less) during steady-state operation (defined as operation during which there is no commanded speed and/or load change) to allow air compressor operation to maintain the brake system reservoirs at full pressure. However, if an auxiliary load other than the air compressor is energized during a commanded speed or load change (a notch change) the emission limits must be met.

BRIEF SUMMARY OF THE INVENTION

The present invention provides improved control over the auxiliary loads, i.e. over the auxiliary power demand of a diesel engine during notch or throttle position changes that command a higher engine output. During load increases, the engine demands more fuel. But, because the air handling system lags the delivery of the increased fuel, the optimum air-to-fuel ratio that provides complete combustion of the fuel is not maintained. Additional simultaneous load demands by an auxiliary component (e.g. the air brake system compressor, radiator fan or motor fan blowers) further increase the engine load, causing the formation of additional smoke and particulates. The auxiliary control system according to the present invention monitors, screens and prioritizes the application of additional auxiliary loads and when possible, defers the application until the load increase demand on the engine due to the throttle position change has been satisfied, i.e., the engine has reached steady-state operation at the new load value. The prioritization scheme is based on the operating condition of the engine and the specific auxiliary load requesting activation. Also, if operating conditions do not permit deferral of the additional auxiliary load, then the auxiliary loads are sequentially switched on and off to avoid a situation where several auxiliary loads simultaneously demand additional power from the diesel engine.

BRIEF DESCRIPTION OF THE DRAWINGS

For better understanding of the present invention, reference may be made to the following detailed description, taking in conjunction with the accompanying drawings, in which.

DETAILED DESCRIPTION OF THE PREFERRED EMBODIMENTS

Figure 1:
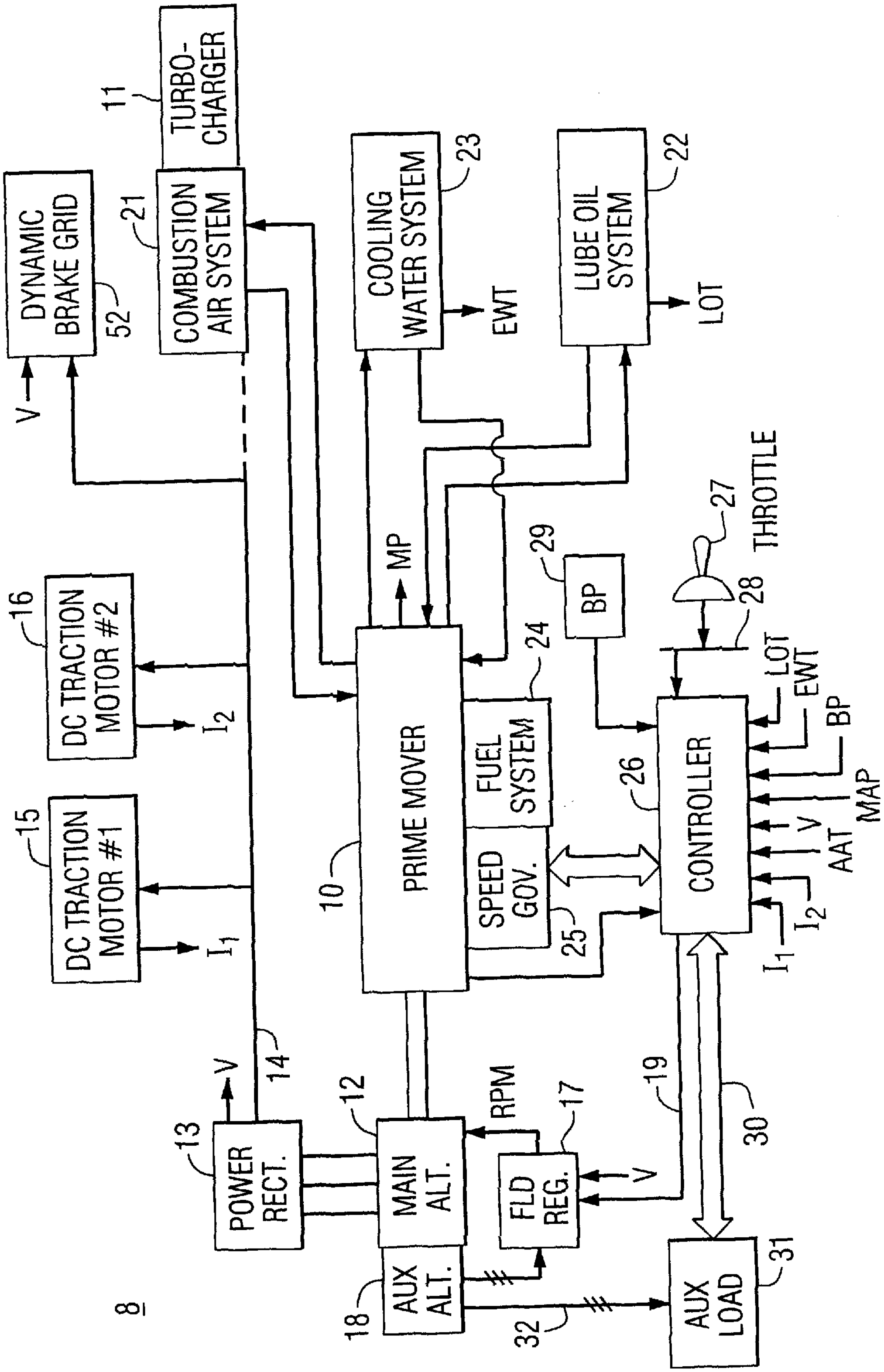
FIG. 1 is a schematic diagram of the principle components of a locomotive system.

Before describing in detail the particular scheme for controlling auxiliary loads in accordance with the present invention, it should be observed that the present invention resides primarily in a novel combination of processing steps and hardware elements related thereto. Accordingly, these processing steps and hardware elements have been represented by conventional processes and elements in the drawings, showing only those specific details that are pertinent to the present invention so as not to obscure the disclosure with details that will be readily apparent to those skilled in the art having the benefit of the description herein.

Referring now to FIG. 1, there is shown a simplified functional block diagram of a locomotive propulsion system 8 including a variable speed prime mover or engine 10 mechanically coupled to drive a three-phase alternating current (AC) synchronous generator 12, also referred to as the main or traction alternator 12. The three-phase voltages generated by the alternator 12 are applied to AC input terminals of at least one three-phase, bi-directional power rectifier bridge 13. In the illustrated system, the locomotive utilizes DC traction motors 15 and 16 for driving the wheels of the locomotive although it is known that AC traction motors can also be utilized. The rectified electric power output of the power rectifier bridge 13 is supplied via a DC bus 14 to the parallel connected armature windings of the traction motors 15 and 16. While only two motors, 15 and 16 are shown, in practice a traction motor is supplied for each axle of a locomotive and there are typically two to three axles per truck with two trucks per locomotive, so that a conventional locomotive may have from four to six traction motors. If the traction motors are AC rather than DC motors, a controlled inverter (not shown) is interposed on the DC bus 14 to supply variable frequency power for driving the AC traction motors.

The prime mover 10 is a thermal or internal combustion engine and is typically a high horsepower, turbocharged, four stroke, sixteen cylinder diesel engine that is intercooled and equipped with electronic fuel injection. The turbocharger 11 supplies compressed air to each diesel engine cylinder to improve the fuel efficiency of the diesel engine.

The prime mover 10 has a number of ancillary systems that are represented by the labeled blocks in FIG. 1. A combustion air system 21 conventionally includes the engine exhaust gas driven turbocharger 11 for supplying compressed air to the combustion air intake manifold of the engine, as discussed above. A lube oil system 22 conventionally includes an engine crankshaft driven pump and associated piping for supplying lubricating oil to the various moving parts of the engine. A cooling water system 23 conventionally includes a pump for circulating relatively cool water from a plurality of air cooled heat exchangers or radiators to a lube oil cooler and to the cylinder liners of the engine for absorbing heat created during the combustion process. Cooling water is also supplied to intercoolers through which the combustion air passes after compression in the turbocharger. Still further, the locomotive propulsion system 8 includes a fuel system 24 comprising a fuel tank, fuel pumps and nozzles for injecting fuel oil into the combustion cylinders, which are arranged in two rows or banks on opposite sides of the prime mover 10. Tappet rods cooperate with fuel cams on a pair of camshafts for actuating the respective fuel injectors at the proper time during each full turn of the engine camshaft. The electronic fuel injection (EFI) controller then controls the initiation and duration of the fuel flow into a cylinder when the associated pump is actuated. The excitation of each fuel pump solenoid and hence the quantity of fuel that is supplied to the engine, is controlled by output signals from an engine speed governor 25, which regulates engine speed by automatically controlling the fuel flow in a direction and by an amount that minimizes the difference between actual and the desired speeds of the engine crank shaft. The desired speed is set by the variable speed control signal received from a controller 26, which signal is herein called a speed command signal or speed call signal. Although shown separately, the electronic speed governor 25 is actually incorporated into the controller 26.

In the normal motoring or propulsion mode of operation, the value of the engine speed call signal provided by the controller 26 is determined by the position of a handle 27 of a manually operated throttle to which the controller 26 is coupled. A locomotive throttle conventionally has eight power positions or notches (N1–N8), plus an idle position and a continuously variable dynamic braking position. N1 corresponds to the minimum desired engine speed and engine horsepower, while N8 corresponds to maximum engine speed and full power delivered to the traction motors 15 and 16. In idle position, the locomotive produces no tractive power, but the diesel engine is operative to produce power for auxiliary functions, such as the motors driving various blowers and fans. In the braking mode, the engine runs at a sufficient speed and horsepower so that those required auxiliary loads, including those that supply cooling air, can continue to operate.

In a consist of two or more locomotives, only the lead unit is typically attended and the controller on board each trailing unit receives a signal, over a train line 28, that indicates the throttle position selected by the operator in the lead unit.

For each throttle position there is a corresponding desired load or current demand by the traction motors 15 and 16. The controller 26 translates the throttle notch information into a control signal of appropriate magnitude on the input line 19 of the alternator field regulator 17, whereby the traction power is regulated to match the called-for power, so long as the product of the alternator output voltage and load current (representing delivered power) is within predetermined limits. For this purpose, it is necessary to supply the controller 26 with information about various operating conditions and parameters of the propulsion system, including the prime mover 10 and its support systems. More particularly, the controller 26 typically receives voltage and current feedback signals representative of the power supplied to the traction motors and a load control signal issued by the engine speed governor 25 if the engine cannot develop the power demanded and still maintain the called-for speed. The controller 26 also receives an engine speed signal (in RPM) indicating the rotational speed of the engine crankshaft and ambient air pressure signal (BP) from a barometric pressure sensor 29, an intake manifold air pressure signal (MAP) from a pressure sensor associated with an air intake manifold at the engine, an oil temperature signal (LOT) from a temperature sensor on the hot oil side of the lube oil cooler, a water temperature signal (EWT) from a temperature sensor in a hot water section of the cooling water system 23 and an ambient air temperature signal (AAT) from an appropriate air temperature sensor. The controller uses the EWT signal to control radiator fan motors for forcing air across the heat exchange tubes of the radiators to maintain a relatively constant engine operating temperature over the load range of the engine and with wide variations in ambient temperature.

The above listing is representative of the signals that are applied to the controller 26 to enable the controller 26 to properly set the fuel level to the prime mover 10 to regulate the power output of the engine to meet the requirements of the locomotive traction system and any auxiliary equipment coupled to the locomotive. Each cylinder of the engine 10 has an individually-controllable fuel injector responsive to a control signal supplied to each cylinder from the controller 26, so that a similar fuel quantity is injected into each cylinder.

A dynamic brake grid 52, also illustrated in FIG. 1, in one embodiment comprises a plurality of resistive or load elements for absorbing and dissipating electrical energy. The dynamic brake grid 52 is cooled by a shunt connected fan, not shown in FIG. 1. In the dynamic braking mode of operation, the dynamic brake grids 52 are shunted across terminals of the traction motors 15 and 16 while the motors, driven by the moving wheels of the locomotive, act as generators. The current generated by the traction motors 15 and 16 passes through the dynamic brake grid 52 where the resistive elements convert the current into heat, which is in turn dissipated by the dynamic braking cooling system.

The prior art locomotive employs a main or traction alternator load control strategy that is active only during notch increases. This load strategy controls the rate at which excitation current is supplied to the main alternator 12, as a function of the engine speed and horsepower, i.e., as a function of the notch position. According to the prior art, there is no load control strategy for the auxiliary alternator and the auxiliary devices deriving their power therefrom, except the radiator fan start-up is delayed for an interval between 15 seconds and 60 seconds after the throttle handle is moved to higher notch position. Specifically, for a change from notch position one to notch position two the radiator fan start is delayed 15 seconds. For a change from notch one to notch eight there is a 60 second delay. Because the locomotive can take longer than 15 seconds to reach steady-state operation after a notch change, this fixed delay time does not account for nor adequately accommodate all transient auxiliary loading scenarios. According to the prior art, no load control strategy is exercised for the brake system air compressor. Whenever the air compressor is required to charge the brake pipe and reservoirs, it is activated irrespective of the notch position or notch transitional state, that is, when the locomotive is transitioning to a new (higher) notch position.

As compared with the prior art, the load control strategy of the present invention incorporates distinct logic decision steps to reduce or eliminate random auxiliary device loading during the interval following a notch change, but prior to the onset of steady-state operation at the new notch position. As discussed above, the activation of traction and/or auxiliary loads during this interval can have a detrimental effect on the transient visible emissions, which may be violative of the current environmental regulations.

Figure 2:
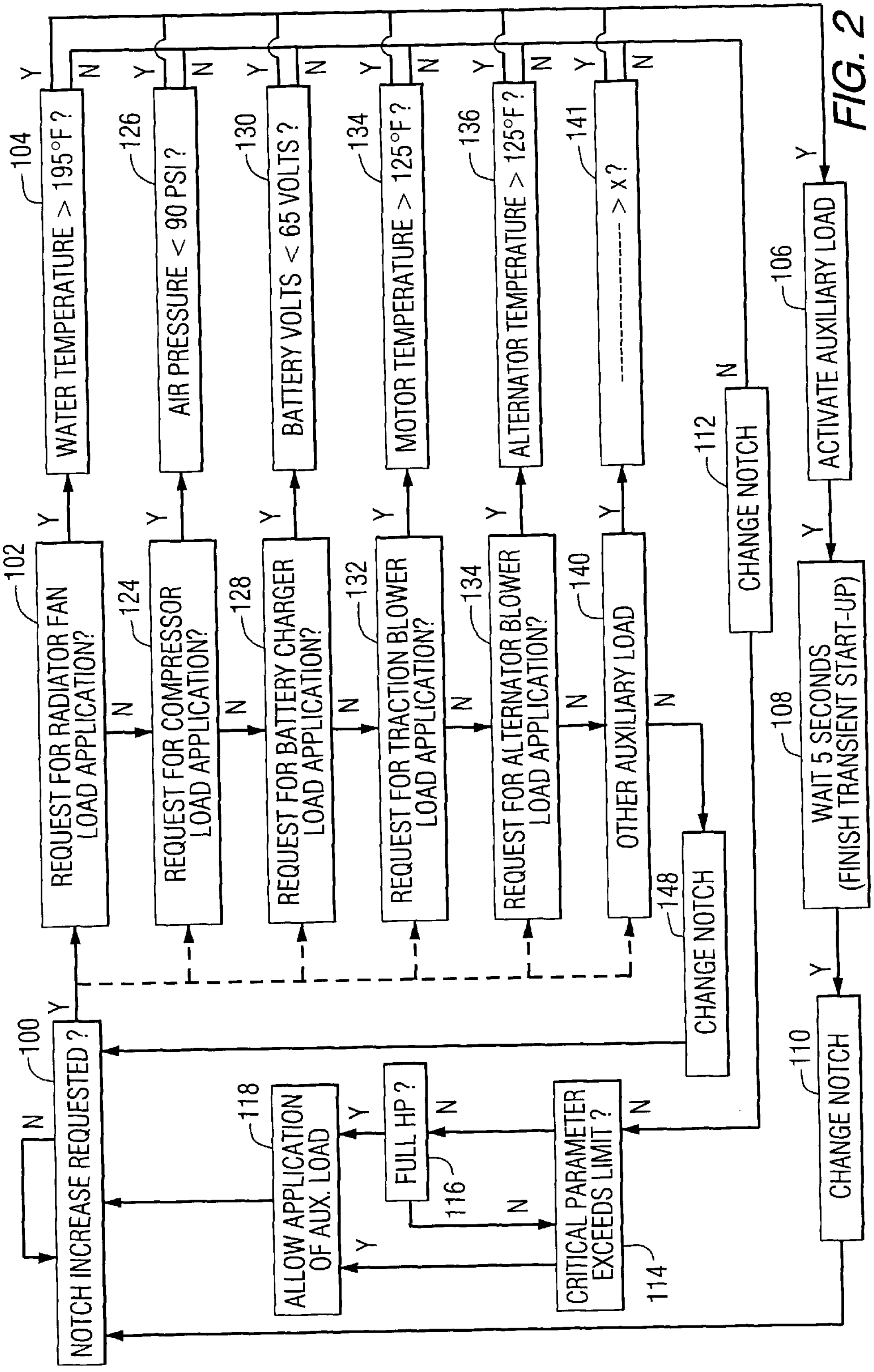
FIG. 2 is a flowchart illustrating the auxiliary load control process of the present invention.

FIG. 2 illustrates an auxiliary load control strategy according to the present invention. The process can be executed by the controller 26, or on a dedicated or shared basis by another microcontroller or microprocessor aboard the locomotive. The process begins at a step 100 to determine whether a notch change has been requested. If a notch change has not been requested, the process loops back to the step 100, which is executed on a relatively frequent basis to ensure that the auxiliary loads are effectively controlled. In one embodiment, the decision step 100 is executed at approximately 60 to 180 millisecond intervals. Note that each request for activation of an auxiliary load is commanded because the condition of the subsystem with which the auxiliary load is associated has fallen below (or above, as the case may be) a first predetermined threshold value. This first threshold value does not necessarily represent a critical subsystem condition, but rather a condition that should be addressed soon to prevent further deterioration of the subsystem condition. Therefore, according to the teachings of the present invention, activation of the associated auxiliary subsystem to ameliorate the condition will not be immediate. Instead, activation is held in abeyance pending any active notch increase requests, that is, until the engine has reached steady-state operation at the new notch position. Thus by avoiding immediate activation of the auxiliary load during a notch transitional phase, prevents undue smoke emissions that may violate EPA regulations.

Generally, as will be discussed below with respect to the details of FIG. 2, when a notch increase is requested and an auxiliary load activation is requested before the engine has reached steady-state operation at the engine horsepower of the new notch position, the auxiliary system is not activated unless the subsystem condition is critical, as determined by the relationship between an operational parameter associated with the subsystem (engine coolant temperature, for example) and a critical threshold value. Only if the subsystem operational parameter exceeds the critical threshold value will the auxiliary load be immediately activated, so that the critical condition can be immediately relieved. If the critical threshold is not exceeded, then the auxiliary subsystem load is not activated until after the engine has reached full horsepower at the new notch position. However, during the time when the engine is transitioning to the new horsepower, the monitoring of the auxiliary subsystem operational parameters continues and if the parameter exceeds the critical value before engine steady-state operation is reached, the auxiliary load is applied, notwithstanding the resultant smoke emissions. In the event that the critical subsystem threshold is exceeded and the auxiliary load is activated, to avoid problems associated with auxiliary load start-up transients, the system halts for a predetermined number of seconds after auxiliary load start-up (five in one example) before the engine is commanded to the horsepower values of the new notch position.

Returning to FIG. 2, if a notch increase has been requested, then processing moves to a step 102 to determine whether there has been a request for starting the radiator fan (i.e., a request for a load application to the radiator fan motor). This request would be made by the controller 26 when the coolant temperature reaches a first predetermined value. By way of example, this first predetermined threshold value for the coolant temperature is preferably lower than the coolant temperature threshold as used on prior art locomotives. Using this lower threshold value allows for a limited coolant temperature increase, without any damaging effects, while the engine is transitioning to the new notch position horsepower value. Thus, according to the teachings of the present invention, activation of the radiator fan can be delayed for a short period if the coolant temperature is above the first threshold value, but below the critical value at which the radiator fan must be immediately activated to prevent damage to the diesel engine and the locomotive. If a radiator fan load application request has been made at the step 102, the process flow moves to a decision step 104, where the water temperature is compared to an exemplary critical value such as 195° F., as shown in FIG. 2. This temperature threshold value represents a critical threshold value and thus if the response at the decision step 104 is affirmative, processing moves to a step 106 where the auxiliary load application is executed. That is, an affirmative answer from the decision step 104 indicates that immediate action is required to lower the coolant water temperature and avoid damage caused by the high temperature. The resulting smoke emissions must be accepted as the price for avoiding engine and locomotive damage.

Following the step 106, a step 108 indicates that some period of time should elapse during which any transients associated with starting the radiator fan motor have ended. The requested notch change can then be initiated at a step 110. The process flow loops back to the initial decision step 100, pending another notch increase request.

Note that a coolant water temperature greater than 195° F. indicates a critical operating condition and therefore the radiator fan must be immediately activated, notwithstanding the formation of detrimental smoke emissions. Thus, the control strategy according to the present invention affords a high priority to water temperature above a critical threshold, recognizing that safe operation requires activation of the radiator fan motor to bring the coolant temperature down, while allowing the undesirable smoke emissions. It should be further noted that under normal operating conditions (i.e., other than during a notch increase request) the radiator fan motor is typically activated if the water temperature exceeds a value less than 195° F. For example, a value of 190° F. might be appropriate. The latter value is designated the first threshold value herein and is used by the decision step 102 to determine whether the radiator fan motor should be activated to reduce the water temperature. This approach builds in some margin to permit the water temperature to increase slightly during a notch change transient before the critical value is reached.

More complicated multiple temperature strategies can also be employed, and the fan control scheme can also take into consideration the ambient temperature and the locomotive notch position. For example, in one control scheme, if the ambient temperature is above 45° F. and the locomotive is in a high notch position (typically considered notch positions four through eight) then if the coolant temperature exceeds 172° F. the radiator fan is energized to run at one-quarter of its full speed; the fan runs at one-half speed at 175° F. coolant temperature and at full speed when the ambient temperature is 182° F.

If the water temperature is not greater than 195° F., then the process moves to a step 112 where the notch change is executed by the controller 26, as discussed above. The process next proceeds to a step 114 where the critical threshold parameter is again checked to determine whether that limit has been exceeded. In the case of the coolant water temperature, that critical value is 195° F. as discussed above. If that critical value has not been exceeded the process moves from the decision step 114 to a decision step 116 where the engine horsepower is checked to determine whether it has reached the full horsepower value associated with the new notch position. When that full horsepower value is reached, the result from the decision step 116 is affirmative and the auxiliary load application is permitted, as shown at a step 118. In one embodiment, the process flow loops between the decision steps 114 and 116 approximately every 0.18 seconds. This loop back ensures that so long as the parametric value is below the critical limit, then the auxiliary load application does not occur until the engine has reached the full horsepower value associated with the new notch position.

Returning to the decision step 114, if the subsystem critical threshold value is exceeded, then processing moves immediately to the step 118 for application of the auxiliary load. Again, in this situation it is deemed preferable to activate the auxiliary load and accept the smoke emissions because a subsystem has reached a critical operating condition.

In summary, according to the FIG. 2 process flow chart, the auxiliary load application occurs only when a subsystem reaches a critical operating condition, as determined by a parametric value exceeding a critical threshold limit. Otherwise, the auxiliary load will not be activated until after the engine has reached the full horsepower value associated with the new notch position.

If there has not been a radiator fan load application request, then from the decision step 102, the process moves to a step 124 to determine whether an air compressor (i.e., for supplying compressed air to the air brake system) load application request has been made. From here, the process executes in a manner similar to the execution associated with the radiator fan motor load application discussed above. From the step 124 the process moves to a step 126. If the air pressure in the brake reservoir is less than 90 psi (in one example) then the air compressor is activated, at the step 105, although the diesel engine has not reached steady-state operation at the new notch position. If the air pressure is not less than 90 psi, then the process moves to the step 112 where the notch change is implemented. Note that activation of the air compressor is commanded by the controller 26 due to a drop in brake air pressure below a first predetermined value. It is in fact this first predetermined value that produces an affirmative response at the decision step 124. But for the transition state of the engine, the air compressor would be energized at this first predetermined value, which is less than the critical value of 90 psi.

If the result from the decision step 124 is negative, the process moves to a step 128 to determine whether a battery charger load application has been requested. If such a request has been made, the process moves to a step 130 where the battery voltage is measured and compared with 65 volts. If the battery voltage is below 65 volts, then the battery charger is immediately activated at the step 106. If the battery voltage is not less than 65 volts, the process flow moves to the change notch step 112 and the subsequent steps of FIG. 2. The battery charger load is then applied after the full horsepower is attained, so long as the battery voltage does not drop below the critical value of 65 volts.

Continuing with FIG. 2, the traction blower (cooling) motor status is examined at the step 132 and the traction motor temperature measured and compared with a value of 125° F. at a step 134. Here again, if the traction motor temperature is greater than 125° F., the traction blower motors are activated (or their speed increased, as the case may be) at the step 106 to cool the traction motors 15 and 16. If the traction motor temperature is less than 125° F. then the process continues to the change notch step 112 and subsequent steps of the FIG. 2 flow chart. According to the FIG. 2 process, the traction blower motors will be activated once the locomotive has reached full horsepower, so long as the motor temperature is not greater than 125° F.

If energization or a speed increase of the alternator blower motor is requested, then the result of the decision step 134 is affirmative, and at a step 136 the alternator temperature is measured. If the temperature is greater than a critical value of 125° F., the alternator blower motor is activated or its speed increased to cool the auxiliary alternator 18 and the main alternator 12. But, if the temperature is less than 125° F., then the activation or speed increase of the alternator blower motor awaits steady-state operation, under control of the steps 112, 114, 116 and 118.

Finally, if the decisions from the decision steps 102, 124, 128, 132, and 134 are all negative, then the process moves to a step 140 to determine whether a request has been made for the activation of any other auxiliary loads. Like the specifically-identified auxiliary loads discussed above, these other auxiliary loads will be energized only after the locomotive has achieved the full horsepower value at the new notch position, or immediately in the event a critical operating parameter had been exceeded. Reference character 141 indicates the step of determining whether the critical operating parameter of other auxiliary loads not specifically mentioned above has been exceeded.

If following the notch change request there has been no request for activation of an auxiliary device, then the process executes through each of the negative result paths from the decision step 102, 124, 128, 132, 134 and 140 to the change notch step 148. Since notch decrements coincident with an auxiliary device loading request do not result in excessive emissions, the notch change reference at the step 100 relates only to notch changes that involve a load increase.

The application of auxiliary loads, including those referenced in FIG. 2, can also be prioritized such that if two auxiliary load application requests are made following a notch change, but prior to the onset of steady-state operation at a new notch position, then only the more critical auxiliary load is applied prior to reaching full horsepower. The second, less critical, auxiliary load is not activated until full horsepower has been achieved. By way of example, typically the air compressor is considered the most critical auxiliary load and thus it would be activated before any of the other loads identified in FIG. 2. To implement such a priority scheme, each of the various engine auxiliary loads, including those set forth in FIG. 2, must be prioritized so that the processor executing the FIG. 2 flow chart can determine the auxiliary load with the higher priority. Thus, according to one embodiment, each of the requests for the application of an auxiliary load (that is, the steps 102, 124, 128, 132, 138 and 140) must be monitored in a parallel fashion to prioritize load application when two or more loads are demanded simultaneously or are demanded during the period that the locomotive is transitioning to a new notch horsepower request. It is also beneficial to implement this parallel monitoring scheme to avoid a situation where a critical operating value is attained by an auxiliary load, thus requiring immediate energization of that load, during the time when the process is executing through other process steps, such as the loop of the steps 114 and 116. Thus although the process of monitoring the loads is explained and illustrated as a serial process in FIG. 2, in another embodiment monitoring of the various loads is conducted on an interpret basis. That is, at certain predetermined intervals during execution of the FIG. 2 process, each subsystem is monitored (the process steps 102, 124, 128, 132, 134, and 140) to determine whether a request for an auxiliary load application is pending. This embodiment is illustrated by the dashed lines shown as an input into each of the process steps 102, 124, 128, 132, 134, and 140.

Figure 3:
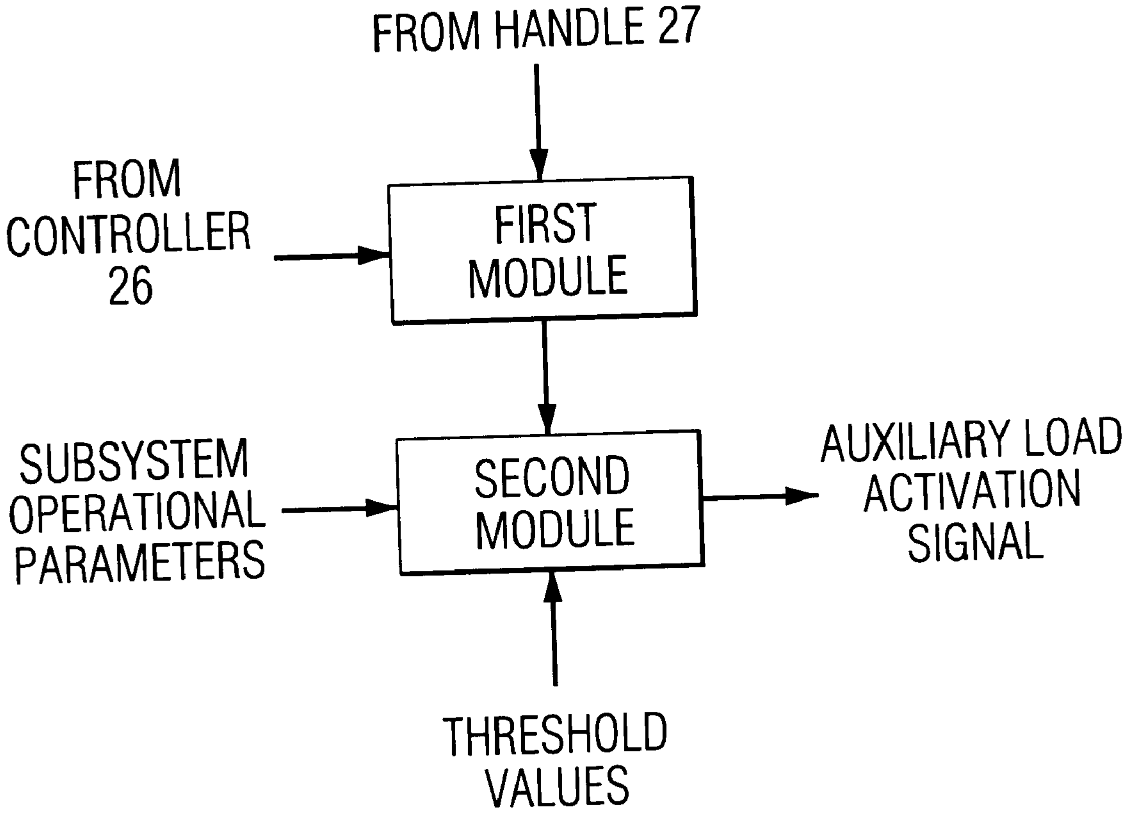
FIG. 3 illustrates a controller for controlling the auxiliary loads according to the teachings of the present invention.

FIG. 3 illustrates a representative hardware embodiment of the teachings of the present invention. Modules 170 and 172 are elements of the controller 26 of FIG. 1. The module 170 is responsive to the throttle notch position, identified as the handle 27 in FIG. 1 and also to the state of the engine relative to the commanded notch position. That is, the module 170 determines whether the engine is operating at steady state at the commanded notch position, or is in a transient mode, ramping up (or down) from a present operating condition to the commanded operating position. The module 172 is responsive to selected subsystem operational parameters to determine if any of those subsystems have reached a critical operating status that requires the activation of an auxiliary load to relive the critical condition. This determination is made by comparing the real-time operational parameter with a threshold value also input to the module 172. Exemplary subsystems and their corresponding auxiliary loads are discussed in conjunction with FIG. 2. Auxiliary loads are activated, as described in the FIG. 2 flowchart, based on the subsystem operating condition (critical or non-critical) and the engine status (transient or steady state). Critical situations are relived by the immediate application of the auxiliary load while the auxiliary load is not activated for non-critical operation conditions during an engine transient that involves a ramp up to a higher engine speed or delivered horsepower. Instead, the auxiliary load is activated only after the engine has returned to steady-state operation. In one embodiment, if the engine speed or horsepower is ramping down to a new commanded notch position, then the auxiliary load is applied even under conditions where the subsystem is not in a critical operating condition because application of the auxiliary load during the ramp down interval will not unduly load the engine.

While the invention has been described with reference to preferred embodiments, it will be understood by those skilled in the art that various changes may be made and equivalent elements may be substituted for elements thereof without departing from the scope of the present invention. In addition, modifications may be made to adapt a particular situation to the teachings of the present invention without departing from its essential scope. For example, the present invention is not limited to diesel engines for locomotive, trucks or off-road vehicles, since other engine types used for automotive, marine or other applications can equally benefit from the teachings of the present invention. Therefore, it is intended that the invention not be limited to the particular embodiments disclosed, but that the invention will include all embodiments falling within the scope of the appended claims.

What is claimed is:

1. For an internal combustion engine comprising a plurality of subsystems, a traction load and a plurality of auxiliary loads, wherein the internal combustion engine supplies operating energy to the traction load and to the plurality of auxiliary loads, and wherein the internal combustion engine operates in a transient mode while the engine speed or delivered horsepower is undergoing a change in response to an operator-initiated request, or in a steady-state mode during which the engine speed and delivered horsepower are substantially stable, and wherein during the transient mode the internal combustion engine may produce exhaust emissions, a method for controlling operation of the plurality of auxiliary loads, said method comprising:

determining whether the internal combustion engine is operating in a transient mode or a steady-state mode;

determining whether a command to activate at least one of the plurality of auxiliary loads, has been issued;

determining whether the subsystem associated with the commanded auxiliary loads is in a critical state, such that activation of the associated auxiliary load tends to relieve the critical state;

if the associated subsystem is in a critical state, activating the commanded auxiliary load; and if the associated subsystem is not in a critical state, delaying activation of the commanded auxiliary loads to limit the exhaust emissions while the internal combustion engine is in the transient mode; and activating the auxiliary load when the internal combustion engine is in the steady-state mode.

2. The method of claim 1 wherein the internal combustion engine further comprises an operator-controlled throttle for controlling the internal combustion engine, and wherein the method is executed in response to a load increase command issued to the internal combustion engine by advancing the throttle.

3. The method of claim 2 wherein the throttle has eight distinct notch positions, and wherein a load increase request is issued by moving the throttle from a first notch position to a higher notch position.

4. The method of claim 2 wherein the internal combustion engine is operating in a steady-state mode when the horsepower delivered by the engine is substantially equal to the horsepower commanded by the throttle notch position.

5. The method of claim 2 wherein the internal combustion engine is operating in a steady-state mode when the engine speed is substantially equal to the engine speed commanded by the throttle notch position.

6. The method of claim 1 wherein one of the plurality of subsystems is the internal combustion engine cooling system, and wherein one of the plurality of auxiliary loads comprises a fan for cooling the cooling system coolant, and wherein the cooling system is in critical condition when the cooling system coolant temperature exceeds a predetermined value.

7. The method of claim 1 wherein the internal combustion engine powers a locomotive comprising an air brake system, and wherein one of the plurality of auxiliary loads comprises a compressor for pressurizing the air brake system, and wherein the air brake system is in a critical state when the air pressure is below a predetermined value.

8. The method of claim 1 wherein the internal combustion engine powers a locomotive comprising a battery charging system, and wherein one of the plurality of auxiliary loads comprises a battery charger for charging the battery, and wherein the battery charging system is in a critical state when the battery voltage is below a predetermined value.

9. The method of claim 1 wherein the internal combustion engine powers a locomotive comprising a traction alternator drivingly coupled to the internal combustion engine, and wherein one of the plurality of auxiliary loads comprises a blower for cooling the traction alternator, and wherein the traction alternator is in a critical state when the traction alternator temperature exceeds a predetermined value.

10. The method of claim 1 wherein the internal combustion engine powers a locomotive comprising an auxiliary alternator drivingly coupled to the internal combustion engine, and wherein one of the plurality of auxiliary loads comprises a blower for cooling the auxiliary alternator, and wherein the auxiliary alternator is in a critical state when the auxiliary alternator temperature exceeds a predetermined value.

11. The method of claim 1 wherein a subsystem is in critical state when an operating parameter of the subsystem exceeds a predetermined operational value.

12. The method of claim 1 wherein when at least two of the plurality of subsystems are simultaneously in a critical state, activation of the associated auxiliary load to attempt to relieve the critical state of the at least two of the plurality of subsystems is based on a priority ranking of the plurality of subsystems, wherein the auxiliary load associated with the higher priority subsystem is activated before the auxiliary load associated with the lower ranking subsystem.

13. The method of claim 1 wherein the command to activate at least one of the plurality of auxiliary loads is executed when an operational parameter of the subsystem has a predetermined relationship with a predetermined first limit value, and wherein the first limit value does not define a critical state for the subsystem.

14. The method of claim 1 wherein the internal combustion engine further comprises an operator-controlled throttle for control thereof, the method further comprising determining whether the subsystem associated with the commanded auxiliary load is in a critical state during a time interval between a load increase command initiated by advancing the operator-controlled throttle and steady-state operation of the internal combustion engine at the commanded load, and activating the commanded auxiliary load if the associated subsystem is in a critical state during the time interval.

15. The method of claim 14 wherein the step of determining whether the subsystem associated with the commanded auxiliary load is in a critical state is executed at predetermined time intervals during the time interval between a load increase command initiated by advancing the operator-controlled throttle and steady-state operation of the internal combustion engine at the commanded load.

16. The method of claim 14 wherein if the commanded auxiliary load is activated, the internal combustion engine is held for a predetermined time at the operating load when the commanded auxiliary load was activated, then released to achieve the commanded load.

17. A method for controlling the activation of auxiliary loads of an internal combustion engine of a locomotive, wherein the engine is drivingly coupled to a main alternator and an auxiliary alternator, wherein the main alternator provides current to one or more traction motors for providing motive power to the locomotive, and wherein the auxiliary alternator provides current to a plurality of auxiliary loads operative in conjunction with an associated subsystem, and wherein the locomotive further includes a manually-operated controller having a plurality of notch positions, and wherein each notch position commands an engine speed/horsepower pair, said method comprising:

determining whether a higher notch position has been commanded by movement of the manually-operated controller;

determining whether the internal combustion engine has reached the engine speed/horsepower of the higher notch position;

determining whether a command has issued to control one of the plurality of auxiliary loads because the operational parameter of the associated subsystem has a predetermined relation to a first predetermined limit;

determining whether the operational parameter of the associated subsystem has a predetermined relation to a second predetermined limit;

if the operational parameter has the predetermined relation to the second predetermined limit, controlling the auxiliary load; and if the operational parameter has the predetermined relation to the first predetermined limit and does not have the predetermined relation to the second predetermined limit and the internal combustion engine has not reached the engine speed/horsepower of the higher notch position, waiting until the internal combustion engine reaches the engine speed/horsepower of the higher notch position, after which the command is executed to control the one of the plurality of auxiliary loads.

18. The method of claim 17 wherein the manually-operated controller includes eight notch positions, and wherein the method is executed only in response to a load increase request issued to the internal combustion engine by advancing the manually-operated controller from a lower to a higher notch position.

19. The method of claim 17 wherein the subsystem associated with the auxiliary load is selected from among: the engine coolant subsystem wherein the operational parameter is coolant temperature and wherein the auxiliary load associated with the engine coolant subsystem is a radiator fan, an air brake subsystem wherein operational parameter is air pressure and wherein the auxiliary load associated with the air brake subsystem is an air compressor, a battery charging subsystem wherein the operational parameter is the battery voltage and wherein the auxiliary load associated with the battery charging subsystem is a battery charger, a traction motor cooling subsystem wherein the operational parameter is the traction motor temperature and wherein the auxiliary load associated with the traction motor cooling subsystem is a first cooling blower, a main alternator cooling subsystem wherein the operational parameter is the main alternator temperature and wherein the auxiliary load associated with the main alternator cooling subsystem is a second cooling blower.

20. A control system for an internal combustion engine comprising a plurality of subsystems, a traction load and a plurality of auxiliary loads, wherein the internal combustion engine supplies operating energy to the traction load and to the plurality of auxiliary loads, and wherein the internal combustion engine operates in a transient mode while the engine speed or horsepower is transitioning to a commanded value in response to an operator-initiated request, or operates in a steady-state mode during which the engine speed and horsepower are substantially stable at the commanded value, said control system for controlling the plurality of auxiliary loads, comprising:

a first module for determining when a request for an engine speed or horsepower change to a commanded value has been initiated and for determining engine operational parameters;

a second module for determining the relationship between an operational parameter for at least one of the plurality of subsystems and a first and a second predetermined threshold value, and for activating the auxiliary load associated with the one of the plurality of subsystems when the operational parameter of the subsystem has a predetermined relation with the first threshold value and the engine is in a steady-state mode, wherein in the steady-state mode the engine speed and horsepower are substantially stable at the commanded value; and wherein said second module activates the auxiliary load associated with the one of the plurality of subsystems when the operational parameter of the subsystem has a predetermined relation with the second threshold value and the engine is in a transient mode, wherein in the transient mode the engine speed or horsepower is transitioning to the commanded value.

21. The control system of claim 20 wherein the second module does not activate the auxiliary load associated with the one of the plurality of subsystems when the operational parameter has a predetermined relation with the first threshold value and the engine is operating in a transient mode.

22. The control system of claim 20 wherein the first module halts the transition of the internal combustion engine to a commanded value for a predetermined time after activation of the auxiliary load associated with the one of the plurality of subsystems.

* * * * *